(12) United States Patent
Tse, Jr.

(10) Patent No.: US 8,270,827 B2
(45) Date of Patent: Sep. 18, 2012

(54) CAMERA LENS ACCESSORY HOLDER

(76) Inventor: Kenneth K. Tse, Jr., Burlingame, CA (US)

( * ) Notice: Subject to any disclaimer, the term of this patent is extended or adjusted under 35 U.S.C. 154(b) by 94 days.

(21) Appl. No.: 12/685,880

(22) Filed: Jan. 12, 2010

(65) Prior Publication Data

US 2011/0170854 A1    Jul. 14, 2011

(51) Int. Cl.
*G03B 11/04* (2006.01)
(52) U.S. Cl. .................................. 396/544; 396/448
(58) Field of Classification Search .......... 396/422–423, 396/530, 544; 224/908, 602–605, 251, 271
See application file for complete search history.

(56) References Cited

U.S. PATENT DOCUMENTS

| | | | | |
|---|---|---|---|---|
| 2,197,184 A | * | 4/1940 | Kemp | 359/611 |
| 2,547,492 A | * | 4/1951 | Rohlik | 206/316.2 |
| 3,828,991 A | * | 8/1974 | Moore | 224/610 |
| 3,924,786 A | * | 12/1975 | Duquette | 224/251 |
| 4,131,147 A | * | 12/1978 | Schrage | 206/316.2 |
| 4,814,806 A | * | 3/1989 | Flax | 396/544 |
| 5,495,290 A | * | 2/1996 | Choi | 348/333.08 |
| 6,287,655 B1 | * | 9/2001 | Nichols, Jr. | 428/35.7 |
| 6,763,946 B1 | * | 7/2004 | Martin | 206/701 |

FOREIGN PATENT DOCUMENTS

| JP | 09230492 A | * | 9/1997 |
|---|---|---|---|
| JP | 11084466 A | * | 3/1999 |
| JP | 2001318403 A | * | 11/2001 |
| JP | 2007021378 A | * | 2/2007 |

\* cited by examiner

*Primary Examiner* — Clayton E Laballe
*Assistant Examiner* — Leon W Rhodes, Jr.
(74) *Attorney, Agent, or Firm* — GSS Law Group

(57) ABSTRACT

A camera lens accessory holder includes an attachment ring configured to couple to a camera lens accessory such as a lens cap or filter, a base coupled to the attachment ring and a holder mount coupled to the base opposite the attachment ring for removably attaching the holder to an external support structure. The base optionally includes a logo surface facing the attachment ring and optionally includes one or more visual elements such as a logo, text, photograph, or symbol. Some embodiments of a camera lens accessory holder include more than one attachment ring. Other embodiments are provided with means for attaching two holders to each other, one each on opposite sides of a flexible strap or belt. Some embodiments include a clip for attachment of a camera lens accessory holder to a belt, strap, or thin sheet of material.

16 Claims, 5 Drawing Sheets

Section A-A

Section A-A

Section A-A

Section A-A

CAMERA LENS ACCESSORY HOLDER

TECHNICAL FIELD

This disclosure is related to holders for accessories that are removably attachable to camera lenses.

BACKGROUND OF THE INVENTION

Various accessories may be attached to a camera lens for controlling the optical performance of a camera or for protecting the lens. Some examples of camera lens accessories include lens caps, filters, supplemental lenses, lens hoods, and adapter rings. After an accessory is removed from a camera lens, it is preferable to protect the accessory by placing it in a secure, sealed storage container. However, a hurried or distracted photographer may instead drop the accessory into a camera bag or pocket or place the accessory on a surface of questionable cleanliness. Any dirt or dust transferred to the accessory may later be transferred to a camera lens. Or, camera lens accessories may be damaged or lost by such mishandling.

What is needed is a convenient and secure means for storing camera lens accessories. What is further needed is a means for storing camera lens accessories that reduces a risk of transferring dirt or dust from an accessory to a camera lens.

SUMMARY OF THE INVENTION

A camera lens accessory holder provides a convenient and secure location for storage of camera lens accessories such as lens caps and filters. Embodiments of a camera lens accessory holder include an attachment ring adapted for removable attachment of a camera lens accessory, a base coupled to the attachment ring, and a holder mount coupled to the base for removably attaching the camera lens accessory holder to an external support structure such as a camera strap, article of clothing, camera tripod, lighting stand, or the like.

In some embodiments of a camera lens accessory holder, the attachment ring is formed as an integral part of the base. Alternatively, the base and attachment ring may be formed separately and attached to each other by adhesive, mechanical fasteners, or assembly of cooperatively threaded surfaces.

Complementary pieces of hook and loop material, an adhesive layer, a clip, snaps, or a piercing pin may optionally be used for the holder mount. A clip may optionally be formed as an integral part of the base. A clip optionally includes a spring for producing a gripping force on an external support structure, or may alternately be formed from a material which generates a gripping force by elastic deflection of the material.

The attachment ring may optionally be configured to hold a camera lens accessory which threads into either internal or external threads on the attachment ring, grips by displacement of one or more movable elements held in place by a spring force, couples with a close sliding fit, or a combination of these methods.

Some embodiments of the invention include more than one attachment ring. A second attachment ring may surround the attachment ring discussed above or may couple to the base next to the attachment ring. In some embodiments, two camera lens accessory holders may be joined together to provide secure storage locations for more than one camera lens accessory.

The base includes an upper surface which may optionally be used for display of one or more visual elements such as a logo, trademark, text, symbol, picture, diagram, or graphic design. The logo surface may be on a physically separate component of some embodiments. The logo surface optionally surrounds an attachment ring or may be visible though an aperture in an attachment ring.

DETAILED DESCRIPTION

This disclosure is related to holders for camera lens accessories such as lens caps, filters, supplemental lenses, lens hoods, and adapter rings. A camera lens accessory holder is disclosed that optionally includes an attachment ring configured to couple to a camera accessory, a base coupled to the attachment ring and a holder mount coupled to the base on a side opposite the attachment ring. The holder mount enables a camera lens accessory holder in accord with an embodiment of the invention to be securely attached to an external support structure. Other advantages of the embodiments of the invention disclosed herein include convenient access to camera lens accessories, protection of at least one surface of the camera lens accessory from dirt, dust, and abrasion, reduction in an amount of dust transferred from a camera lens accessory to a camera lens, and a holder mount for quickly attaching and detaching a camera lens accessory holder to a variety of external support structures.

Figure 1:
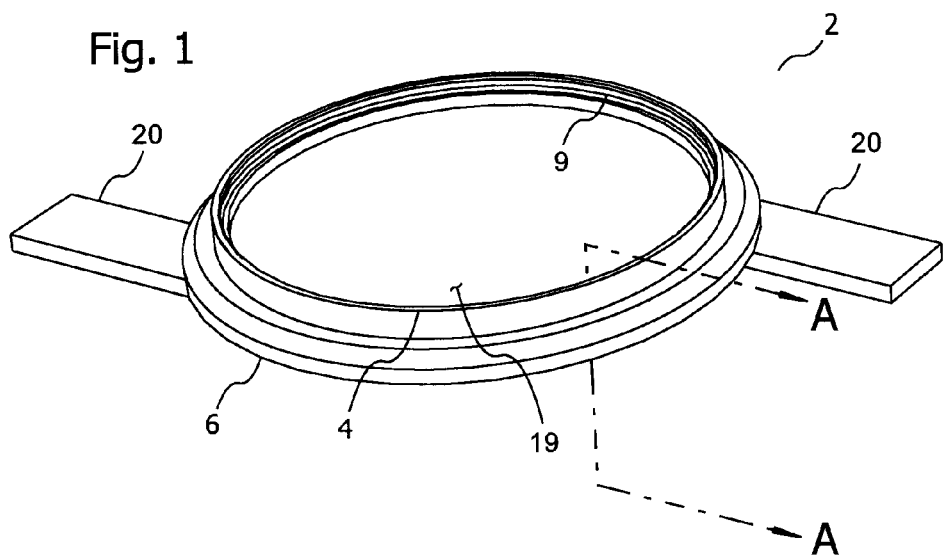
FIG. 1 shows a pictorial view toward a front surface of a camera lens accessory holder in accord with an embodiment of the invention having an attachment ring, a base, and a holder mount for removably attaching the camera lens accessory holder to an external support structure.

Referring to the drawings more particularly by reference numbers, FIG. 1 shows a pictorial view toward a front surface of an example of a camera lens accessory holder 2, also referred to herein as a holder 2, for holding at least one camera lens accessory. The holder 2 optionally includes an attachment ring 4 configured to removably couple to a camera lens accessory, for example by an internal thread 9 on the attachment ring 4. The holder 2 further includes a base 6 coupled to the attachment ring 4. When coupled to the attachment ring 4, a camera lens accessory such as a lens cap, filter, or supplemental lens forms an enclosed space above a front surface 19 of the base 6 and bordered on the sides by the attachment ring 4. The front surface 19 of the base 6 is also referred to herein as the logo surface 19. The face of the camera lens accessory facing the logo surface 19 is preferably the face which would be closest to a camera lens front surface when the accessory is installed on the camera lens. By sealing a face of the camera lens accessory into a sealed space, dust and dirt is prevented from accumulating on that face of the accessory. Dirt and dust that is prevented from accumulating on the face of the accessory is also prevented from being transferred from the face of the accessory to a camera lens.

The holder 2 of FIG. 1 also includes a holder mount for removably attaching the base 6 to an external support structure such as, but not limited to, a flexible strap or belt, a camera bag, purse, backpack, toolbox, or other container, an article of clothing, or a bracket, light stand, pole, tripod, or cable. In some embodiments, the holder mount attaches to the base with adhesive. In other embodiments, the holder mount is mechanically retained against the base. In the example of FIG. 1, the holder mount comprises pieces of hook and loop fastener material 20. Other examples of a holder mount suitable for use with embodiments of the invention include, but are not limited to, an adhesive layer, a clip, snaps, or a piercing pin.

Figure 2:
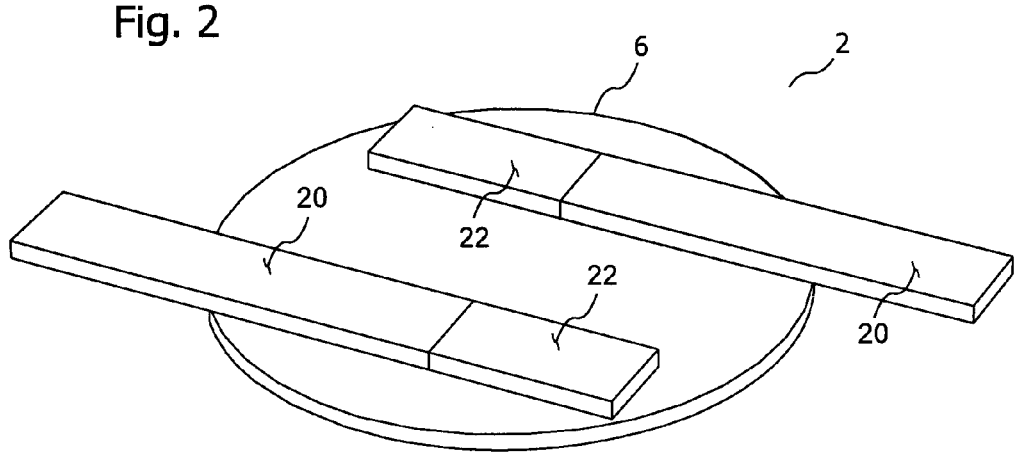
FIG. 2 is a pictorial view toward a back surface of the camera lens accessory holder of FIG. 1, showing an example of a holder mount comprising strips of complementary parts of hook and loop fastener attached to a back surface of the base.

An example of one of many alternative arrangements of hook and loop fastener material on the back surface of a holder is shown in FIG. 2. FIG. 2 shows a pictorial view toward a back surface of the base 6 for the holder 2 of FIG. 1. Strips of hook and loop fastener material, including the hook portion 20 and the complementary loop portion 22, are affixed to the back surface of the base 6. A length of the hook portion 20 and a length of the complementary loop portion 22 in FIG. 2 are selected to be sufficient for wrapping around a selected external support structure so as to secure the base 6 of the holder 2 at a convenient location against the external support structure.

Figure 3:
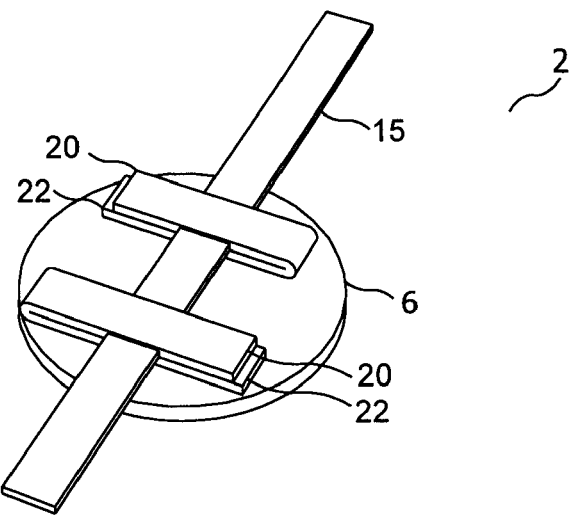
FIG. 3 is a pictorial view toward a back surface of the embodiment of the invention of FIGS. 1 and 2, showing a base held against an example of an external support structure comprising a flexible strap by strips of hook and loop fastener material wrapped around the strap.

FIG. 3 shows the example of a holder from FIGS. 1 and 2 attached to an example of an attachment site selected by a person using the camera lens accessory holder. In the example of FIG. 3, an embodiment of the invention is attached to a segment of a flexible strap 15 that is firmly held between complementary pieces of hook and loop fastener material (20, 22). In FIG. 3, two strips of hook and loop fastener material are shown folded over the segment of strap 15. In other embodiments, a different number of complementary strips and different sizes of hook and loop fastener material may optionally be used. In some embodiments of the invention, hook and loop material has a selected magnitude of attachment strength, that is, an amount of force required to separate a hook portion from a loop portion.

Figure 4:
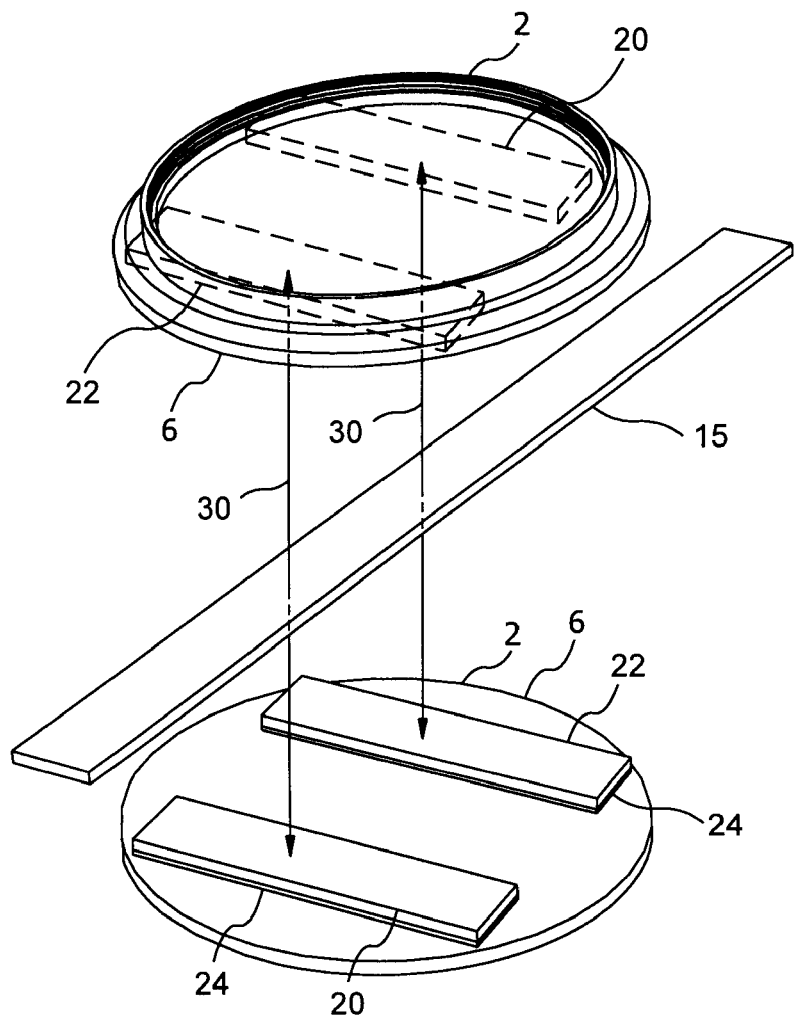
FIG. 4 is a pictorial view of two instances of an alternative embodiment of the invention in which opposing, complementary strips of hook and loop fastener material enable two camera lens accessory holders to be joined together, holding a flexible strap between them.

Strips of hook and loop fastener material are attached to the base of some embodiments of the invention so that pairs of holders may be attached together so as to hold a strap or belt between them. FIG. 4 shows an example of two holders 2 in position for attaching to each other so as to clamp a segment of a strap 15 between them. The upper holder 2 includes a piece of hook material 20 and a piece of loop material 22 attached approximately parallel to each other on the back surface of the base 6. Hook and loop material is affixed to the base 6 with adhesive 24. A lower holder 2 is equipped with a similar arrangement of hook and loop material (20, 22) on the back surface of the base 6. When two holders 2 are located on opposite sides of the strap 15, with the back surface of the base 6 of each holder facing the back surface of the base 6 of the other, and with the holders rotated so that the hook portion 20 of the upper holder 2 is aligned with the loop portion 22 of the lower holder 2 as suggested in the figure by alignment arrows 30, the two holders 2 may be firmly attached at a selected location on the strap 15 by pressing the holders together. The arrangement of FIG. 4 permits two or more camera lens accessories to be stored in a convenient location on the strap 15.

Figure 5:
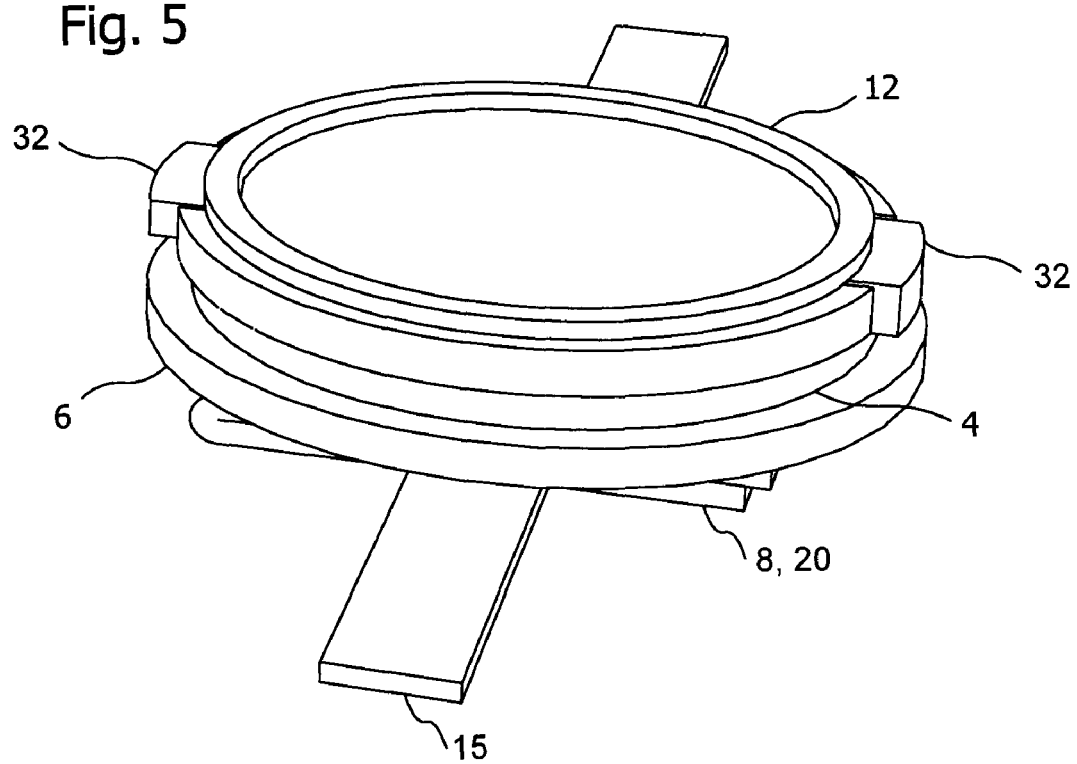
FIG. 5 is a pictorial view of an example of a lens cap removably attached to an embodiment of the invention.

FIG. 5 shows a pictorial view of an example of a lens cap attached to the camera lens accessory holder of FIGS. 1-3. As shown in FIG. 5, a camera lens accessory holder comprising an attachment ring 4, a base 6, and a holder mount 8 comprising hook and loop fastener material 20 are attached to a flexible strap 15. A lens cap 12 of a type sometimes referred to as a pinch cap includes two slidable tabs 32 which are pressed inward toward the center of the cap to free the cap from a camera lens or camera lens accessory holder. After positioning the lens cap 12 on a camera lens or camera lens accessory holder, the tabs are released to cause the cap to grip the lens or the holder's attachment ring. Some lens caps 12 will have sides which are flush with the sides of the attachment ring 4. Other lens caps 12 will have sides which extend over the sides of the attachment ring 4, as shown in FIG. 5.

Figure 6:
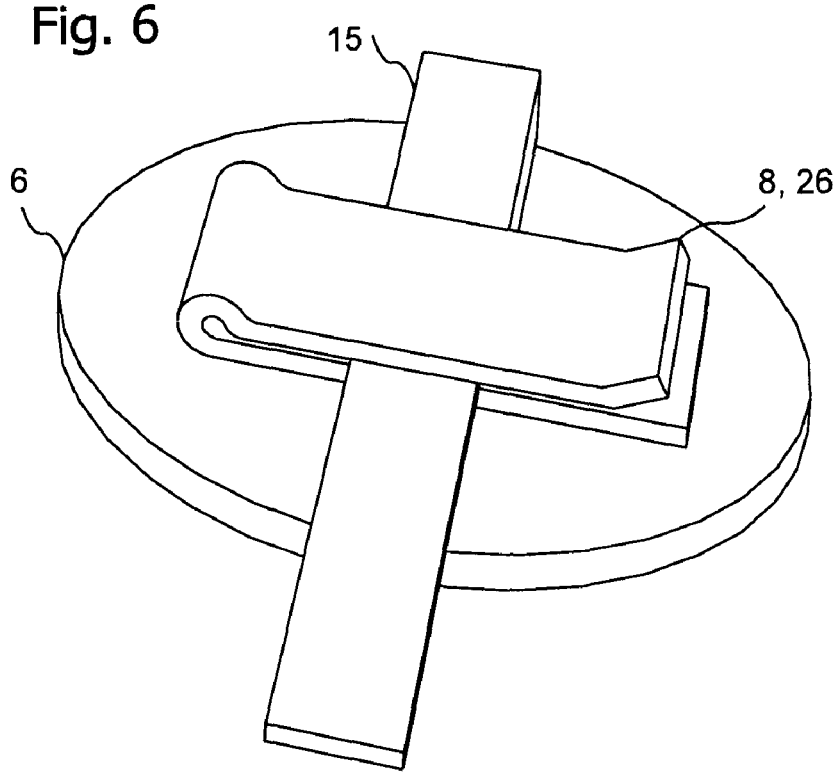
FIG. 6 is a pictorial view of an alternative embodiment of the invention having a clip attached to a back surface of the base, and further illustrating a portion of a flexible strap held within the clip.

Some embodiments of a camera lens accessory holder use a clip for securing the holder to a flexible strap, belt, or other relatively thin sheet of material. An example of a holder with a clip is shown in FIG. 6. FIG. 6 illustrates a pictorial view toward a back surface of the base 6 of a holder. A holder mount 8 comprising a clip 26 is firmly attached to the base 6. Alternately, the clip 6 may be formed as an integral part of the base 6. A segment of a strap 15 is held in place between the compression faces of the clip 26. The clip 26 may optionally be used to attach a camera lens accessory holder to a thin piece of metal or plastic, for example a notebook or clipboard.

Figure 7:
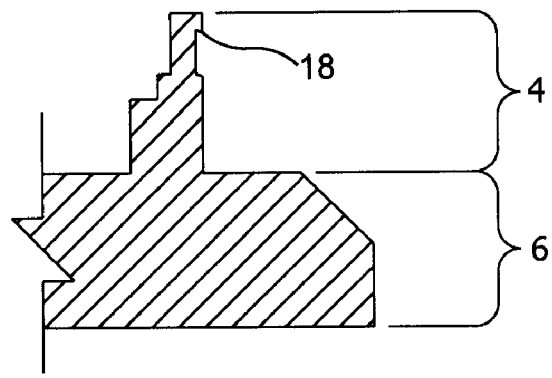
FIG. 7 is a partial cross sectional view of an example of a base and an attachment ring formed together as one integral structure, in which the attachment ring portion is formed with an external lip.

In the example of FIG. 1, a holder 2 includes an attachment ring formed with an external thread 9. FIGS. 7-10 illustrate alternatives to the embodiment of FIG. 1. FIGS. 7-10 represent partial sectional views of a base 6 and an attachment ring 4 at a position marked by a section line A-A in FIG. 1. In FIG. 7, partial section A-A illustrates a holder comprising an attachment ring portion 4 and a base portion 6 integrally formed as one part. The attachment ring portion 4 is shown in FIG. 7 with an external lip 18 for holding a camera lens accessory.

Figure 8:
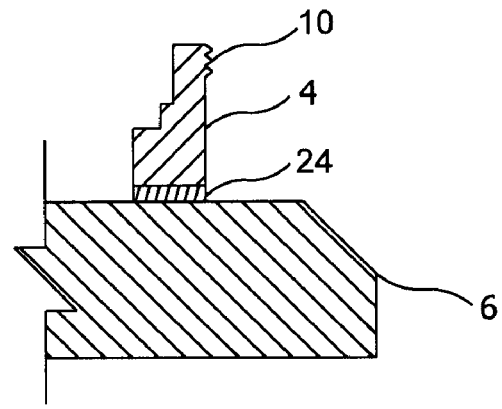
FIG. 8 is a partial cross sectional view of an alternative embodiment of the invention having an attachment ring with external threads for attachment of a lens accessory and a base joined to the attachment ring by a layer of adhesive.
Figure 9:
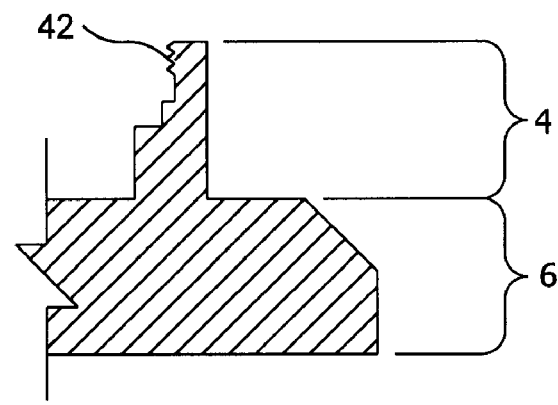
FIG. 9 is a partial cross sectional view of an another example of a base and an attachment ring formed together as one integral structure, in which the attachment ring portion is formed with internal threads for attachment of a lens accessory.
Figure 10:
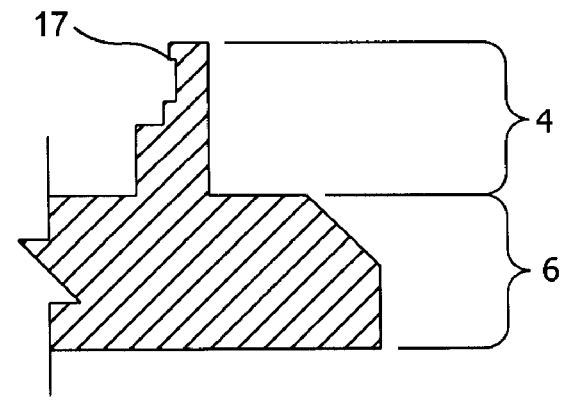
FIG. 10 is a partial cross sectional view of yet another example of a base and an attachment ring formed together as one integral structure, in which the attachment ring portion is formed with an internal lip.

A holder comprising an attachment ring 4 and a separately formed base 6 joined to the attachment ring 4 by a layer of adhesive 24 is shown in FIG. 8. The attachment ring 4 of FIG. 8 further illustrates an attachment ring 4 having an external thread 10 for holding a camera lens accessory. FIG. 9 shows another example of a holder with integral attachment ring portion 4 and base portion 6 as in FIG. 7. The attachment ring portion 4 of the holder in FIG. 9 is formed with an internal thread 42 for attachment of a camera lens accessory. FIG. 10 shows yet another example of a holder with integral attachment ring portion 4 and base portion 6 as in FIG. 7 and FIG. 9. The attachment ring portion 4 of the holder in FIG. 10 is formed with an internal lip 17 for holding a camera lens accessory. Any of the examples of FIGS. 7-10 may optionally be made with internal thread, external thread, an internal lip, an external lip, or combinations of two or more of these features for attachment of a camera lens accessory.

Figure 11:
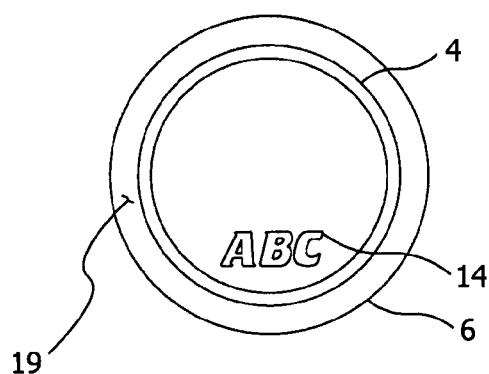
FIG. 11 is a view toward a front surface of an embodiment of the invention, showing a surface on the base which may optionally be used for placement of a logo, text, or graphic design, and further showing an example of a logo.
Figure 12:
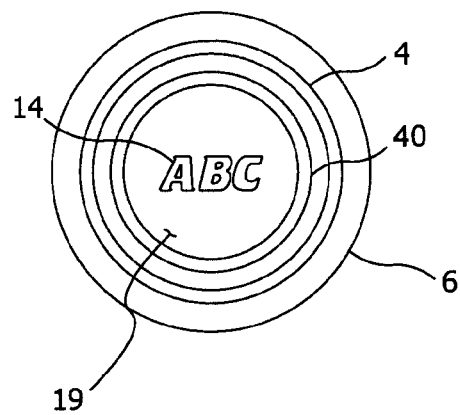
FIG. 12 shows a view toward a front surface of an alternative embodiment of the invention having a first attachment ring and at least one more optional attachment ring nested within the first attachment ring.

Some embodiments of a camera lens accessory holder are adapted for display of a visual element such as, but not limited to, a logo, trademark, text, symbol, picture, diagram, or graphic design. Visual elements may be prepared by any convenient means such as photocopying, photography, silk screen, printing press, computer printer, and so on. In some embodiments, a visual element is applied to a surface of the base. In other embodiments, the visual element is prepared as a separate layer that is subsequently attached to the base. FIGS. 10-12 show examples of camera lens accessory adapters with visual elements.

FIG. 11 shows a view toward a front surface of a holder comprising an attachment ring 4 and a base 6. The front surface of the base 6 visible in FIG. 11 is also referred to as a logo surface 19. Text characters representative of a visual element 14 are shown in a selected location inside the attachment ring 4 on the logo surface 19.

FIG. 12 also shows a front view of a visual element 14 applied to a logo surface 9 of a base 6. FIG. 12 further illustrates an example of an embodiment of a camera lens accessory holder having more than one attachment ring. In the example of FIG. 12, a first attachment ring 4 is affixed to the logo surface 19 of a base 6. A second attachment ring 40 is also attached to the logo surface 19 of the base 6, nested within the first attachment ring 4.

Figure 13:
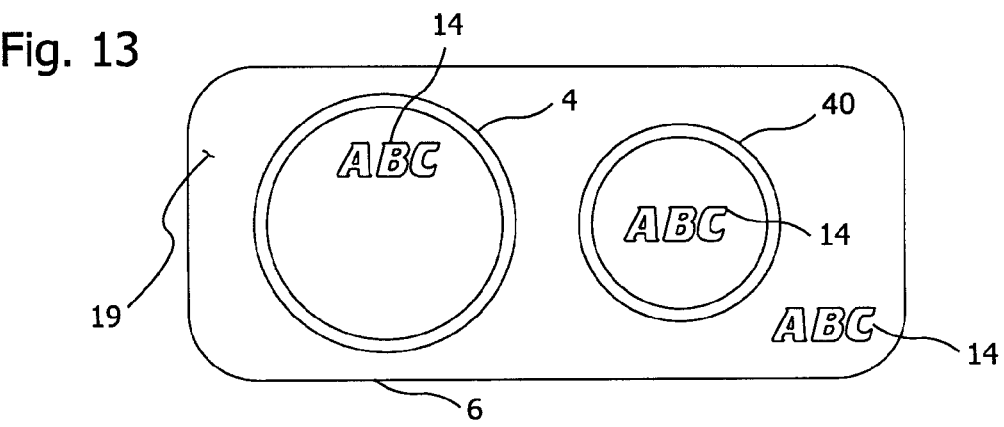
FIG. 13 shows a view toward a front surface of an alternative embodiment of the invention having more than one attachment ring.

FIG. 13 shows a plurality of visual elements 14 applied at selected locations on a logo surface 19 of a base 6. The embodiment of FIG. 13 also includes more than one attachment ring, with a first attachment ring 4 and a second attachment ring 40 attached side by side on the base 6. The attachment rings (4,40) are the same size in some embodiments of the invention and different sizes in other embodiments of the invention. A different visual element 14 may optionally be applied at each selected location on the logo surface 19.

Any of the embodiments of the invention presented in FIGS. 1-13 may optionally have an attachment ring with an outer diameter selected for a close sliding fit of a lens cap designed to be retained on a camera lens by a simple friction fit.

The preceding embodiments provide examples and are not meant to constrain the scope of the following claims.

What is claimed is:

1. A holder, comprising:
    a first attachment ring formed as a hollow cylinder and adapted for removable attachment of a camera lens accessory;
    a second attachment ring formed as a hollow cylinder and adapted for removable attachment of a camera lens accessory;
    a base comprising:
        a front surface on which said first and second attachment rings are positioned;
        a back surface; and
        a side surface connected to said front surface and said back surface; and
        a holder mount attached to said back surface of said base, and adapted for removable attaching said base to an external support structure;
        wherein dust is prevented from accumulating on a surface of the camera lens accessory facing said front surface of said base when the camera lens accessory is attached to said first attachment ring.

2. The holder of claim 1, wherein said holder mount includes at least one member of a group consisting of a hook portion of hook and loop material, a loop portion of hook and loop material, an adhesive layer, a clip, and a piercing pin.

3. The holder of claim 2, wherein said holder mount attaches to said base with adhesive.

4. The holder of claim 1, wherein at least one of said first and second attachment rings includes external thread configured for coupling to a camera lens accessory.

5. The holder of claim 1 wherein at least one of said first and second attachment rings includes internal thread configured for coupling to a camera lens accessory.

6. The holder of claim 1 wherein at least one of said first and second attachment rings includes a circumferential external lip.

7. The holder of claim 1 wherein at least one of said first and second attachment rings includes a circumferential internal lip.

8. The holder of claim 1, wherein said second attachment ring surrounds said first attachment ring.

9. The base of claim 1, further comprising a logo surface coupled to said base and configured to receive a logo.

10. The holder of claim 1, wherein said base includes a logo.

11. The holder of claim 1 wherein said base and at least one of said attachment rings are formed as an integral part.

12. The holder of claim 1, wherein said holder mount comprises:
    a strip of hook and loop material attached to said back surface of said base; and
    a strip of a complementary piece of hook and loop material attached to said back surface of said base, extending outward from said side surface of said base, foldable toward and removably attachable to said strip of hook and loop material, and when folded around an external support structure and attached to said strip of hook and loop material, enabling said holder to be removably attachable to the external support structure.

13. A holder, comprising:
    an attachment ring formed as a hollow cylinder and adapted for removable attachment of a camera lens accessory and for movable attachment to an external structural support;
    a base comprising:
        a front surface on which said attachment ring is positioned;
        a back surface; and
        a side surface connected to said front surface and said back surface; and
    a holder mount attached to said back surface of said base, comprising:
        a strip of hook and loop material attached to said back surface of said base; and
        a strip of a complementary piece of hook and loop material attached to said back surface of said base, extending outward from said side surface of said base, foldable toward and removably attachable to said strip of hook and loop material, and when folded around an external support structure and attached to said strip of hook and loop material, enabling said holder to be removably attachable to the external support structure;
    wherein dust is prevented from accumulating on a surface of the camera lens accessory facing said front surface of said base when the camera lens accessory is attached to said attachment ring.

14. The holder of claim 13, further comprising a second attachment ring on said base.

15. The holder of claim 14, wherein said second attachment ring surrounds said first attachment ring.

16. A holder, comprising:
an attachment ring formed as a hollow cylinder and adapted for removable attachment of a camera lens accessory;
a base comprising:
a front surface on which said attachment ring is positioned;
a back surface; and
a side surface connected to said front surface and said back surface; and
a holder mount attached to said back surface of said base with adhesive, and adapted for removable attaching said base to an external support structure;
wherein dust is prevented from accumulating on a surface of the camera lens accessory facing said front surface of said base when the camera lens accessory is attached to said attachment ring.

* * * * *